Nov. 15, 1932.  W. G. IKIN  1,887,811
BATTERY
Filed Oct. 27, 1931
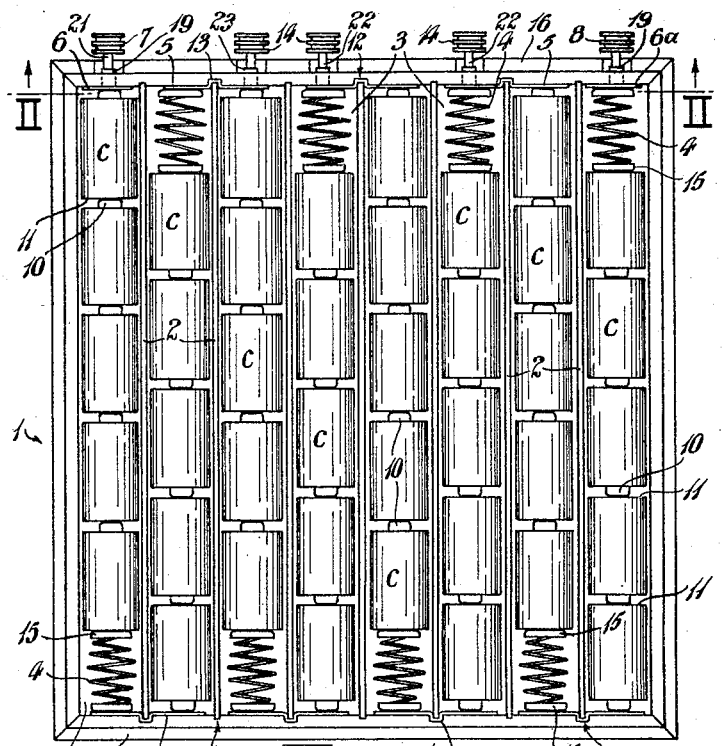
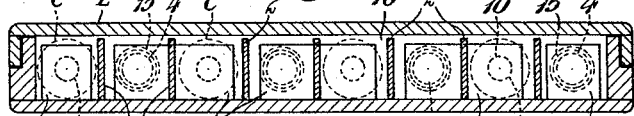
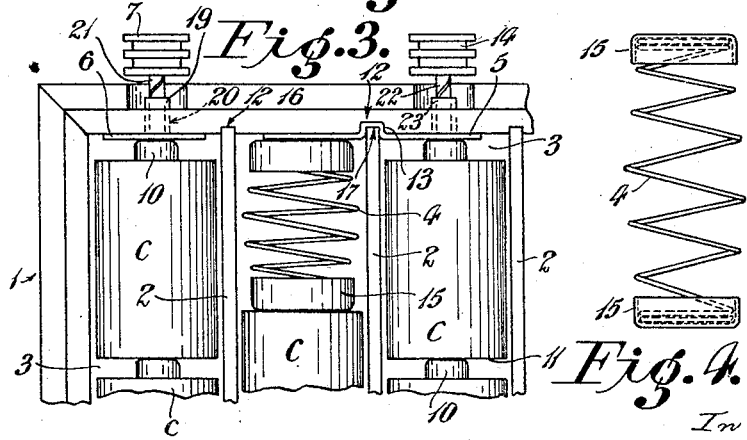
Inventor;
William George Ikin Patented Nov. 15, 1932

1,887,811

UNITED STATES PATENT OFFICE

WILLIAM GEORGE IKIN, OF BOROREN, QUEENSLAND, AUSTRALIA

BATTERY

Application filed October 27, 1931, Serial No. 571,405, and in Australia November 3, 1930.

This invention refers to an electric battery and its container in which latter are assembled individual units of single or multiple dry cells to form a battery of predetermined capacity, the advantage over batteries with permanently jointed cells being that a defective cell may be instantly detached or replaced by an active cell.

The battery is useful for radio receiving or transmitting apparatus in which it is employed as a high tension anode or B-battery in conjunction with thermionic valves.

Batteries of this type comprise a series of rows of cells separated by partitions with the cells arranged in end to end relationship and springs employed for clamping each row of cells to maintain the positive terminal of one cell in electrical contact with the bottom or negative end of the adjacent cell. At one end of the row contact plates are provided for bridging the end cells of adjacent rows.

Batteries of such construction comprise a number of parts all of which are apt to get out of order or displaced and unless manufactured at a comparatively low cost such batteries cannot compete with other types used for like purposes.

The object of the invention is mainly to provide improved means for assembling the parts in the container in such a simple and reliable manner that the work can be expeditiously accomplished by unskilled persons.

With this object in view none of the parts including the partitions of the container are positively fixed, and on the contrary are held in position by pressure so that any part can be instantly detached by the possessor of the battery for testing and replacement by a sound part if such is found necessary.

The improved means moreover for fitting the parts together in the container are such that the container will stand considerable jolting without displacement of the parts.

According to one feature of the invention the flat bridging plates are held in position by the end of a partition, and according to the preferred form the flat end bridging plates are formed with a central U-section projection formed by indenting said plate. Said projection is fitted into a corresponding groove formed in the side of the body of the container and the plate is retained in position by sliding one end of a partition into the indent, the other end of said partition being fitted in a groove formed in the opposite side of the container.

A disability existing in known batteries of this type is due to the use of ordinary coil springs for maintaining the cells of a row in contact as such springs are apt to make a faulty contact.

According to an improvement of the present construction the springs are fitted at both ends with detachable caps, the flat heads of which ensure a reliable contact with negative ends of the cells and the flat contact plates.

The invention is illustrated in the accompanying drawing whereof—

Fig. 1 is a plan of the container, with the lid removed, showing an assemblage therein of a series of separate single cell units to form a battery of substantial capacity.

Fig. 2 a transverse section on line II—II of Fig. 1.

Fig. 3 an enlarged view of portion of Fig. 1.

Fig. 4 is an enlarged detail of a spring with end caps.

Referring to the drawing the shallow container 1 for the rows of cells C is constructed of any suitable material such as wood, fibre, rubber, vulcanite or a composition of either or of metal with suitable insulation where necessary.

The container is divided by a series of preferably parallel partitions 2 forming elongated shallow compartments 3 of approximately the width of the dry cells to prevent lateral displacement of the latter and the maximum capacity of the battery required is determined by the number of assembled cells employed.

At one end of each compartment 3 is a coil spring 4 formed of suitable metal, copper plated for instance to act as a conductor and clamps the cells together. At the opposite end of the compartment is a bridging contact plate 5 or the like preferably formed of metal of low resistance.

The springs 4 are provided at both ends with detachable cylindrical caps 15 of low resistance metal, so that the flat heads of said cap will ensure a good broad contact with the negative bottom 11 of a cell and the bridging contact plates 5.

The bridging plates 5 are extended across the ends of two adjacent compartments and form the electrical connection between the positive terminal 10 of an end cell of a row and the conducting spring 4 of the adjacent row.

Each plate 5 is retained in position against the side of the container by the end of a partition bearing against said plate. Preferably in order to positively prevent lateral displacement of the plates each is formed from top to bottom about the centre with an outer projection 13 that may be of U-section by forming an indent 17 in said plate. The plate is dropped into position against one side 16 of the container with the projection 13 fitted in a groove 12 formed in said side.

The plate is retained in position by sliding one end of a partition 2 into the indent 17 in the plate, the other end of said partition being slid into a corresponding groove 12 formed in the opposite side 16 of said container.

It will be noted therefore that expert skill is not necessary in fitting the springs and partitions in position and moreover any partition and plate may be instantly released when desired.

It will be noted the cells are reversed in adjacent compartments and that the springs are located at opposite ends of same and that a bridging plate connects the positive terminal 10 of an end cell with the spring 4 which is in contact with the negative end 11 of another cell.

Terminal contact plates 6 and 6a of low resistance and shorter than the bridging plates are provided at the respective ends of the battery and to same are connected the external main battery positive and negative terminals 7 and 8 for utilizing the full capacity of the battery.

The positive terminal 10 of the end cell of one end compartment bears by spring pressure against the contact plate 6 and keeps it in place against the side of the container and likewise the cap 15 of spring 4 in the other end compartment bears against contact plate 6a and also retains it in place against the side of the container.

The contact plate 6 and 6a may each be provided with a socket 19 fitting a hole 20 formed through the side of the container in which socket is fitted the terminal 7 or 8 which may be plugged or screwed into said socket. Alternatively the socket or sleeve may be independent of the plate, in which case the stem 21 of the terminal passes into the socket or sleeve which bears against the plate.

The length of each compartment is such that the length between the end of the spring 4 and the remote contact plate therein is sufficient to permit assemblage of a plurality of dry cell units C such as those of the single cylindrical type arranged in end contact and consequently in alignment or in a row as illustrated in Fig. 1.

The cell units C are placed in each compartment in alignment, with the positive terminal 10 at one end of a cell contacting with the bottom or negative end 11 of the adjacent cell, and with the caps 15 of each spring bearing against the bottom end 11 of an end cell in a row and the adjacent plate such as 5, 6 or 6a.

The battery formed may be provided with tapping terminals 14 external of the container to enable a current of suitable voltage to be employed and such terminals may be fitted in the side of the body with their stems 22 passing into sleeves or sockets 23 fitted in holes formed in the side of the container and contacting with the bridging plates 5. In Fig. 1 such terminals are only shown in connection with certain rows of cells but they may likewise be applied to the remaining rows.

It is to be understood that though the battery is illustrated with the cells in series, they may also be arranged in series parallel.

As illustrated in Fig. 2, when the lid L is on the container it is in close contiguity to the cells, thus preventing same being displaced vertically and interrupting the circuit. It will also be noted that the removal or raising of the lid does not interrupt the circuit as is the case with some batteries of this type.

I claim:—

A battery comprising a container, detachable partitions therein forming compartments, a series of dry cells placed in end to end relationship to form rows in each compartment, bridging contact plates electrically connecting said rows, a coil spring between each bridging contact plate and one end of a row, said bridging plates formed with a projection and an indent, and the opposite sides of the container with grooves, said projection engaging a groove in one side and retained therein by the end of a partition engaging said indent, the other end of the partition being fitted in the opposite groove and terminal contact plates and terminals at the respective ends of the assembled cells.

WILLIAM GEORGE IKIN.